United States Patent
Stange et al.

(10) Patent No.: US 7,725,215 B2
(45) Date of Patent: May 25, 2010

(54) DISTRIBUTED AND RECOVERABLE DIGITAL CONTROL SYSTEM

(75) Inventors: Kent Stange, Phoenix, AZ (US);
Richard Hess, Glendale, AZ (US);
Gerald B Kelley, Glendale, AZ (US);
Randy Rogers, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 299 days.

(21) Appl. No.: 11/381,608

(22) Filed: May 4, 2006

(65) Prior Publication Data

US 2007/0135975 A1    Jun. 14, 2007

Related U.S. Application Data

(60) Provisional application No. 60/705,843, filed on Aug. 5, 2005.

(51) Int. Cl.
*G06F 11/00* (2006.01)
*G06F 7/00* (2006.01)
*B64C 19/00* (2006.01)

(52) U.S. Cl. .................. 701/1; 701/3; 701/29; 701/31; 701/36; 244/75.1; 244/194; 714/2; 714/11

(58) Field of Classification Search ............... 701/1–4, 701/14, 29, 31, 33–36; 244/75.1, 76 R, 194–195; 714/1–2, 10–11, 15, 230, 25, 30–31, 47–48
See application file for complete search history.

(56) References Cited

U.S. PATENT DOCUMENTS 4,345,327 A    8/1982    Thuy (Continued)

FOREIGN PATENT DOCUMENTS

EP    0363863    4/1990

(Continued)

OTHER PUBLICATIONS

Lee, "Design and Evaluation of a Fault-Tolerant Multiprocessor Using Hardware Recovery Blocks", Aug. 1982, pp. 1-19, Publisher: University of Michigan Computing Research Laboratory, Published in: Ann Arbor, MI.

(Continued)

*Primary Examiner*—Jack W. Keith
*Assistant Examiner*—Edward Pipala
(74) *Attorney, Agent, or Firm*—Fogg & Powers LLC (57) ABSTRACT

A real-time multi-tasking digital control system with rapid recovery capability is disclosed. The control system includes a plurality of computing units comprising a plurality of redundant processing units, with each of the processing units configured to generate one or more redundant control commands. One or more internal monitors are employed for detecting data errors in the control commands. One or more recovery triggers are provided for initiating rapid recovery of a processing unit if data errors are detected. The control system also includes a plurality of actuator control units each in operative communication with the computing units. The actuator control units are configured to initiate a rapid recovery if data errors are detected in one or more of the processing units. A plurality of smart actuators communicates with the actuator control units, and a plurality of redundant sensors communicates with the computing units.

20 Claims, 4 Drawing Sheets

U.S. PATENT DOCUMENTS

| | | | |
|---|---|---|---|
| 4,453,215 A | 6/1984 | Reid | |
| 4,751,670 A | 6/1988 | Hess | |
| 4,996,687 A | 2/1991 | Hess et al. | |
| 5,086,429 A | 2/1992 | Gray et al. | |
| 5,313,625 A | 5/1994 | Hess et al. | |
| 5,550,736 A | 8/1996 | Hay et al. | |
| 5,732,074 A | 3/1998 | Spaur et al. | |
| 5,757,641 A | 5/1998 | Minto | |
| 5,903,717 A | 5/1999 | Wardrop | |
| 5,909,541 A | 6/1999 | Sampson et al. | |
| 5,915,082 A | 6/1999 | Marshall et al. | |
| 5,949,685 A | 9/1999 | Greenwood et al. | |
| 6,058,491 A | 5/2000 | Bossen et al. | |
| 6,065,135 A | 5/2000 | Marshall et al. | |
| 6,115,829 A | 9/2000 | Slegel et al. | |
| 6,134,673 A | 10/2000 | Chrabaszcz | |
| 6,141,770 A | 10/2000 | Fuchs et al. | |
| 6,163,480 A | 12/2000 | Hess et al. | |
| 6,185,695 B1 | 2/2001 | Murphy et al. | |
| 6,189,112 B1 | 2/2001 | Slegel et al. | |
| 6,279,119 B1 | 8/2001 | Bissett et al. | |
| 6,367,031 B1 | 4/2002 | Yount | |
| 6,393,582 B1 | 5/2002 | Klecka et al. | |
| 6,467,003 B1 | 10/2002 | Doerenberg et al. | |
| 6,560,617 B1 | 5/2003 | Winger et al. | |
| 6,574,748 B1 | 6/2003 | Andress et al. | |
| 6,600,963 B1 | 7/2003 | Loise et al. | |
| 6,625,749 B1 | 9/2003 | Quach | |
| 6,751,749 B2 | 6/2004 | Hofstee et al. | |
| 6,772,368 B2 | 8/2004 | Dhong et al. | |
| 6,789,214 B1 | 9/2004 | De Monis-Hamelin et al. | |
| 6,813,527 B2 | 11/2004 | Hess | |
| 6,990,320 B2 | 1/2006 | LeCren | |
| 7,003,688 B1 | 2/2006 | Pittelkow et al. | |
| 7,062,676 B2 | 6/2006 | Shinohara et al. | |
| 7,065,672 B2 | 6/2006 | Long et al. | |
| 7,178,050 B2 | 2/2007 | Fung et al. | |
| 7,320,088 B1 | 1/2008 | Gawali | |
| 7,334,154 B2 | 2/2008 | Lorch et al. | |
| 7,401,254 B2 | 7/2008 | Davies | |
| 2002/0099753 A1 | 7/2002 | Hardin et al. | |
| 2002/0144177 A1 | 10/2002 | Kondo et al. | |
| 2003/0126498 A1 | 7/2003 | Bigbee et al. | |
| 2003/0177411 A1 | 9/2003 | Dinker et al. | |
| 2003/0208704 A1 | 11/2003 | Bartels et al. | |
| 2004/0019771 A1 | 1/2004 | Quach | |
| 2004/0098140 A1 | 5/2004 | Hess | |
| 2004/0221193 A1 | 11/2004 | Armstrong et al. | |
| 2005/0022048 A1 | 1/2005 | Crouch | |
| 2005/0138485 A1 | 6/2005 | Osecky et al. | |
| 2005/0138517 A1 | 6/2005 | Monitzer | |
| 2006/0041776 A1 | 2/2006 | Agrawal et al. | |
| 2006/0085669 A1 | 4/2006 | Rostron et al. | |
| 2008/0016386 A1 | 1/2008 | Dror et al. | |

FOREIGN PATENT DOCUMENTS

| | | |
|---|---|---|
| EP | 0754990 | 1/1997 |
| EP | 1014237 A1 | 6/2000 |

OTHER PUBLICATIONS

Racine, "Design of a Fault-Tolerant Parallel Processor", 2002, p. 13.D.2-1-13.D.2-10, Publisher: IEEE, Published in: US.

Dolezal, "Resource Sharing in a Complex Fault-Tolerant System", 1988, pp. 129-136, Publisher: IEEE.

Ku, "Systematic Design of Fault-Tolerant Mutiprocessors With Shared Buses", "IEEE Transactions on Computers", Apr. 1997, pp. 439-455, vol. 46, No. 4, Publisher: IEEE.

DISTRIBUTED AND RECOVERABLE DIGITAL CONTROL SYSTEM

This application claims the benefit of priority to U.S. Provisional Application No. 60/705,843, filed on Aug. 5, 2005, which is incorporated herein by reference. The present application is related to U.S. patent application Ser. No. 11/381,637, filed May 4, 2006, and to U.S. Patent application Ser. No. 11/381,652, filed May 4, 2006, both of which are incorporated herein by reference.

The U.S. Government may have certain rights in the present invention as provided for by the terms of Contract No. CRA NCC-1-393 with NASA.

BACKGROUND TECHNOLOGY

Computers have been used in digital control systems in a variety of applications, such as in industrial, aerospace, medical, scientific research, and other fields. In such control systems, it is important to maintain the integrity of the data produced by a computer. In conventional control systems, a computing unit for a plant is typically designed such that the resulting closed loop system exhibits stability, low-frequency command tracking, low-frequency disturbance rejection, and high-frequency noise attenuation. The "plant" can be any object, process, or other parameter capable of being controlled, such as an aircraft, spacecraft, medical equipment, electrical power generation, industrial automation, valve, boiler, actuator, or other device. A control effector is used to provoke a response by the plant. For example, when the plant is an aircraft, control effectors may be in the form of flight control surfaces such as rudders, ailerons, and/or elevators.

Various types of failures or faults may be encountered by conventional computing units found in control systems. A "hard fault" is a fault condition typically caused by a permanent failure of the analog or digital circuitry. For digital circuitry, a "soft fault" is typically caused by transient phenomena that may affect some digital circuit computing elements resulting in computation disruption, but does not permanently damage or alter the subsequent operation of the circuitry.

Soft faults may be caused by electromagnetic fields created by high-frequency signals propagating through the computing system. Soft faults may also result from spurious intense electromagnetic signals, such as those caused by lightning that induce electrical transients on system lines and data buses which propagate to internal digital circuitry setting latches into erroneous states. In addition to lightning, other elements of the electromagnetic environment (EME) such as high-intensity radiated fields (HIRF), radio communications, radar pulses, and the intense fields associated with electromagnetic pulses (EMP) may also cause soft faults. Further, high-energy atomic particles from a variety of sources (e.g., atmospheric neutrons, cosmic radiation, weapon detonation, etc.) may deposit sufficient energy in the bulk semiconductor material of a digital device to set electronic circuits into erroneous states. With the advent of smaller integrated circuits running at high speeds, soft faults are becoming more common such as in the radiation environment encountered by aircraft traveling at high altitudes. In such an environment, computing circuits containing state-of-the-art digital devices may be more susceptible to failure.

In conventional control systems, various forms of redundancy have been used in an attempt to reduce the effects of faults in critical systems. Multiple processing units, for example, may be used within a computing system. In a system with three processing units, for example, if one processor is determined to be experiencing a fault, that processor may be isolated and/or shut down. The fault may be corrected by correct data (such as the current values of various control state variables) being transmitted (or "transfused") from the remaining processors to the isolated unit. If the faults in the isolated unit are corrected, the processing unit may be re-introduced to the computing system along with the other two processing units.

Dissimilar computational redundancy is used to prevent the introduction of generic faults in control system architectures. Generic faults refer to common errors in system redundancies. Such errors can occur in the design and development of the hardware and software elements within general purpose computers that are used in control system architectures. As such, dissimilar computational redundancy would entail each redundant hardware element using a dissimilar microprocessor and each redundant microprocessor executing software (e.g., operating system, application, etc.) that was developed using a different programming language.

Other methods that have been used to help ensure the continued operation of control systems include the use of dissimilar technology, distributed computation redundancy, equalization, and mid-value voting. Each of these methods, however, generally requires at least one processing unit to remain operational at all times to preserve state variables. While the control systems may remain operational if all but one of the processing units experience a soft fault and the correctly-operating unit can be identified, the control system will not operate properly if all of the processors simultaneously experience soft faults. Similarly, if a lone properly-operating unit cannot be identified within the system, the system will not recover, as there would be no identifiable operating unit with correct values for all of the state variables to be transfused to the remaining units. In addition, because of the transfusion of state variables from other processing units, the system recovery may be relatively slow. It may therefore take an extended period of time for all processing units within the system to resume normal operation. In the meantime, redundant control is undesirably lost or degraded.

In the aerospace field, digital flight control systems are frequently interposed between the pilot and the flight control surfaces of an aircraft. Such systems may include fly-by-wire, auto-pilot, and auto-land systems. In a fly-by-wire system, in lieu of pilot controls being mechanically coupled (e.g., via cables or hydraulics) to the various primary flight control surfaces of the aircraft (such as the ailerons, elevators, and rudder), the position and movements of a pilot's controls are electronically read by sensors and transmitted to a computing system. The computing system typically sends electronic control signals to actuators of various types that are coupled to the primary flight control surfaces of the aircraft. The actuators are typically configured to move one or more control surfaces according to inputs provided by the pilot, or in response to feedback measured by a sensor on the aircraft. Failure of the control system could thus have catastrophic effects on the aircraft. Similarly, industrial, medical, or other systems may be gravely affected by certain control system failures.

In conventional flight control system (FCS) architectures, recovery from soft faults of FCS architectural elements, particularly in the flight control computer, is either not possible, has to resort to recovery attempts after a grace period of time, or requires recycling of power such as rebooting the computer. Any of these circumstances can impact the mean time between unscheduled removals (MTBUR) negatively. In addition, tight tolerance monitoring has been dependant on synchronous operations for tight tracking of redundant elements, and has been relatively federated and not easily scaleable.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

The present invention relates to a real-time multi-tasking computer control system with recovery capability. In one embodiment, the control system can be implemented with a flight control computer (FCC) to provide rapid real-time rollback recovery in a multi-tasking computer environment. Selective and isolated recovery triggers are provided for each FCC used.

In the following description, various embodiments of the present invention may be described herein in terms of various architecture elements and processing steps. It should be appreciated that such elements may be realized by any number of hardware or structural components configured to perform specified operations. For purposes of illustration only, exemplary embodiments of the present invention will frequently be described herein in connection with aircraft avionics. The invention is not so limited, however, and the concepts and devices disclosed herein may be used in any control environment. Further, it should be noted that although various components may be coupled or connected to other components within exemplary system architectures, such connections and couplings can be realized by direct connection between components, or by connection through other components and devices located therebetween. The following detailed description is, therefore, not to be taken in a limiting sense.

According to various exemplary embodiments of the invention, a control system architecture suitably includes sufficient computation redundancy and control command management to either isolate and recover a faulted processor, or to recover all processing units of the redundant system without adverse effects. Computational redundancy may be provided with multiple processors or processing units within a computer or computing platform. In addition to isolating and recovering from internal faults, various embodiments allow processing units to detect faults in other system elements such as sensors, adaptors, actuators and/or effectors. Further embodiments may also include one or more actuator adaptor units, that through the detection of adverse data errors, detect faults in other system components (that are in addition to the processing units) and issue discrete instructions to trigger a recovery.

An exemplary control system architecture suitably includes multiple processors, each of which is configured for rapid recovery from various faults. The term "rapid recovery" indicates that recovery may occur in a very short amount of time. To maintain the operation of a control system, it is generally desirable that a recovery from a soft fault takes place within about 1 to 2 computing frames. As used herein, a "computing frame" is the time needed for a particular processing unit to perform a repetitive task of a computation, e.g., the tasks that need to be calculated continuously to maintain the operation of the controlled plant. In some embodiments, processor recovery is performed within about 1 computing frame and redundancy recovery is performed within about 1 or 2 computing frames, or otherwise in a short enough time period so as to have only minimal effects, if any, on system performance.

The length of a computing frame is dependent upon the stability of the plant being controlled. In the aviation industry, for example, fighter jets are generally less stable than larger passenger jets. Thus, a fighter jet may require computational updates about every 2 ms to maintain stability, while a more stable aircraft may only require a computational update about every 200 ms to maintain the same level of stability. Thus, a computing frame in a fighter jet may be 2 ms long, while a computing frame for a passenger jet may be 200 ms long.

The ability of a processor to initiate recovery from a soft fault allows various embodiments of the present invention to aid in the recovery of the system as a whole. In addition, soft faults may be detected in the same computing frame or within several frames in which the faults occur. In embodiments wherein faults are detected within a single computing frame, each processor need only store control and logic state variable data for the immediately preceding frame for use in recovery purposes, which may take place essentially instantaneously. Accordingly, the dependence of each component upon other redundant components is suitably reduced.

In one embodiment of the invention, a scaleable control system architecture is provided that can be used for independent rapid recovery of any flight control computer (FCC). This provides robust operation in the presence of soft fault producing threats, and increased system reliability which is not dependent upon synchronous operations.

Instructions for carrying out the various methods, process tasks, calculations, control functions, and the generation of signals and other data used in the operation of the system of the invention are implemented, in some embodiments, in software programs, firmware, or computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

By way of example, and not limitation, such computer readable media can include floppy disks, hard disks, ROM, flash memory ROM, nonvolatile ROM, EEPROM, RAM, CD-ROM, DVD-ROM, or other optical disk storage, magnetic disk storage, or other magnetic storage devices, or any other medium that can be used to carry or store desired program code means in the form of computer executable instructions or data structures. When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media. Computer executable instructions comprise, for example, instructions and data which cause a general purpose computer, special purpose computer, or special purpose processing device to perform a certain function or group of functions.

The system of the invention will also be described in the general context of computer readable instructions, such as program modules, being executed by a processor. Generally, program modules include routines, programs, objects, data components, data structures, algorithms, etc. that perform particular tasks or implement particular abstract data types. Computer executable instructions, associated data structures, and program modules represent examples of a program code means for executing steps of the methods disclosed herein. The particular sequence of such executable instructions or associated data structures represents examples of corresponding acts for implementing the functions described in such steps.

Figure 1:
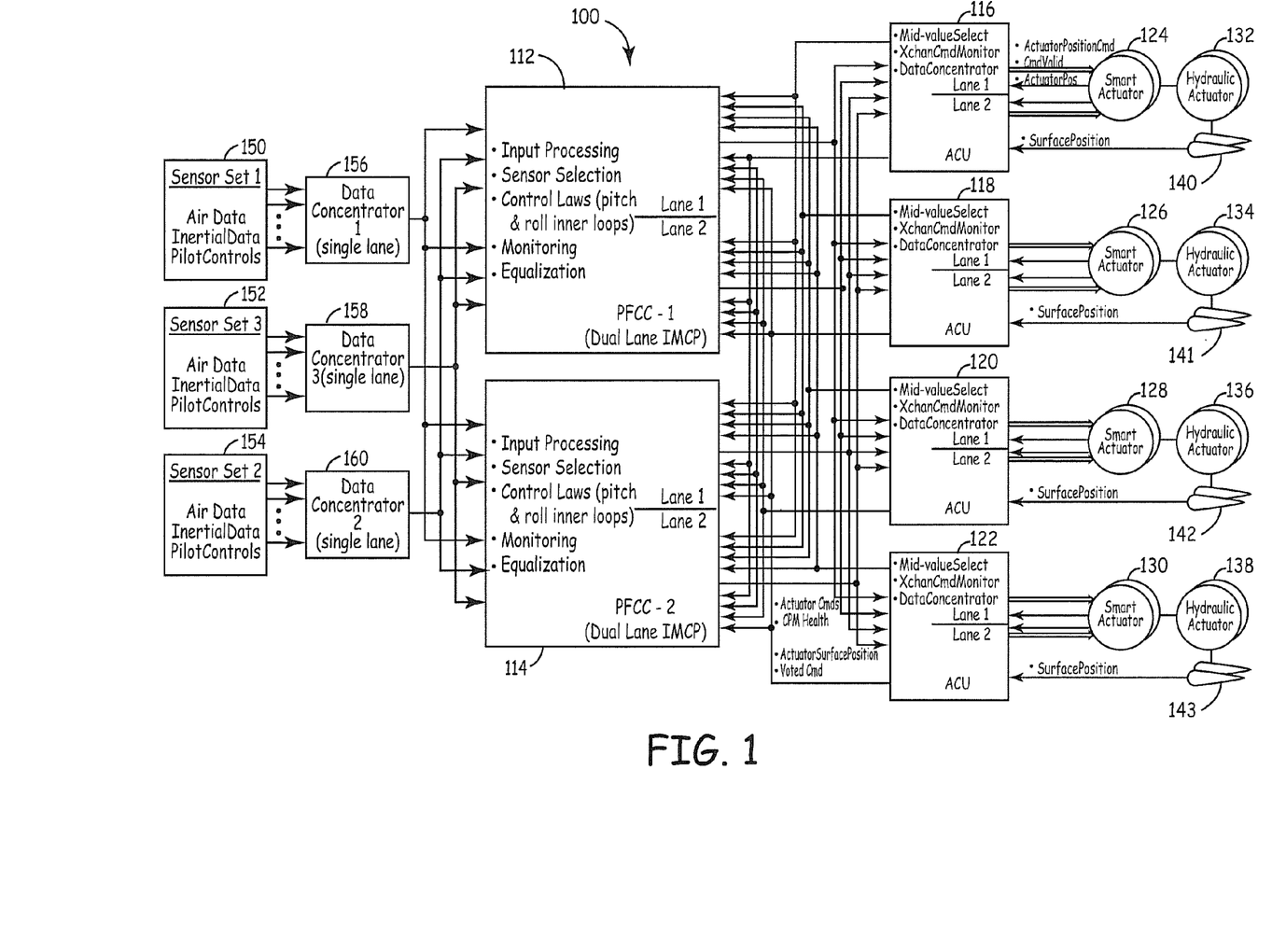
FIG. 1 is a block diagram of a digital control system according to one embodiment of the invention.

Referring now to FIG. 1, an exemplary scaleable architecture of a digital control system 100 according to one embodiment of the invention includes a first computing unit 112 and a second computing unit 114. The computing units 112 and 114 can be any digital control device such as a digital computer or processor, and provide for redundancy in processing. Each computing unit 112, 114 suitably includes one or more processing devices capable of executing multiple and/or simultaneous software processes. As shown, the computing units 112 and 114 can include real-time multi-tasking computing platforms such as a primary flight control computer (PFCC). The PFCC can be an integrated modular computing platform (IMCP) with dual computing lanes.

The computing units 112 and 114 provide input processing, sensor selection, control laws (e.g., pitch, yaw, and roll inner loops), monitoring (e.g., actuator and effector position monitoring), equalization, rapid recovery, redundancy management, and any appropriate recovery triggers. Although control system 100 is shown with two computing units, additional computing units can be employed if desired.

Each of the computing units 112 and 114 are in operative communication with a multitude of actuator control units (ACUs) 116, 118, 120, and 122, which provide for actuator command (Cmd) management and have dual computing lanes. The ACUs perform command blending and selection, and use other redundant actuator command values while a computing platform such as a PFCC lane is recovering. The ACUs also perform monitoring of actuator command lanes, data concentration, and initiation of a selective and isolated recovery trigger of each monitored application. The ACUs can also be redundant per control axis. Although control system 100 is shown with four ACUs, a varying number of ACUs can be employed depending upon system requirements. For example, in some embodiments three or more ACUs can be employed in a control system according to the invention.

Each ACU 116, 118, 120, and 122 is also in operative communication with a respective one of a smart actuator 124, 126, 128, and 130. An actuator is made "smart" when an electronics module such as an electronic interface unit (EIU) is added to the basic actuator. The smart actuators used in the control system can be dual-channel, fail-passive, electromechanical actuators, which contain two independent computational lanes. The smart actuators receive actuator position command signals from the ACUs. The smart actuators also determine validity of commands from the computing unit based on command validity flags and activity monitoring. The smart actuators 124, 126, 128, and 130 are configured to provide feedback to the respective ACU 116, 118, 120, and 122 related to actuator position information.

The smart actuators 124, 126, 128, and 130 can optionally be in operative communication with a respective servo or actuator device such as hydraulic actuators 132, 134, 136, and 138. The hydraulic actuators 132, 134, 136, and 138 can be respectively coupled to various control effectors 140, 141, 142, and 143 such as, for example, various primary flight control surfaces of an aircraft (e.g., rudders, ailerons, and/or elevators). The control effectors 140-143 are configured to provide feedback to the respective ACU 116, 118, 120, and 122 related to effector position information.

As depicted in FIG. 1, the computing units 112 and 114 receive data inputs from sensor sets 150, 152, and 154, which can include air data, inertial data, or commands from an operator (e.g., pilot controls, etc.). The sensor sets can include any number of gyroscopes, vehicle position sensors, airflow sensors, temperature sensors, and/or other sensing devices as may be appropriate for the particular implementation. A data concentrator 156, 158, and 160 with a single lane can be implemented between each sensor set 150, 152, 154 and computing units 112 and 114. The data concentrators suitably receive and concentrate data from the sensors to provide an interface to computing units 112 and 114 as appropriate. The data concentrators may also provide sensor validity monitoring to ensure that the sensors remain active. Each of the sensors may optionally include rapid recovery elements if available and desired for the particular implementation.

The control system 100 can be suitably implemented, for example, as part of a digital flight control system to provide functions for the safe flight and landing of aerospace vehicles. The control system 100 provides for independent recovery of any computing lane, and all system elements can be executed asynchronously. Also, control system 100 can accommodate the asynchronous operation of dissimilar computational redundancy. For example, the PFCC performs equalization of surface positions, and an actuator command management voting algorithm accommodates asynchronous surface command inputs and could accommodate computational lanes using dissimilar computational redundancy. Generic faults in the PFCC can be confined due to other system elements being sufficiently analyzable.

Figure 2:
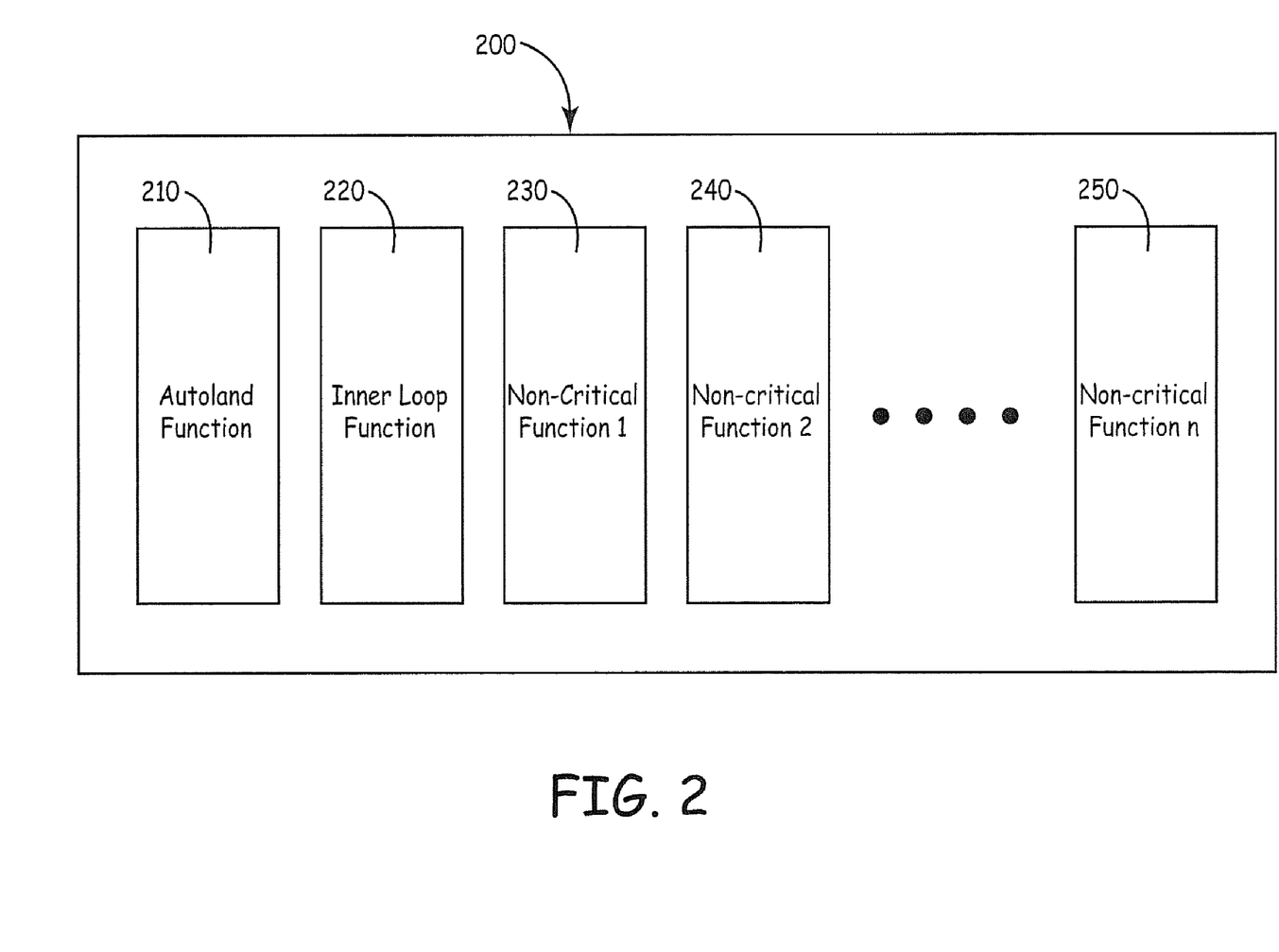
FIG. 2 is a block diagram of a real-time multi-tasking computing platform that can be used in the digital control system of the invention.

FIG. 2 is a block diagram showing further details of a real-time multi-tasking computing platform 200 that can be used in control system 100 of FIG. 1. For example, computing platform 200 can be implemented in computing units 112 and 114 of control system 100. The computing platform 200 hosts the software applications that implement multiple integrated functions with varying degrees of safety impact, and provides scalability to the system. Such scalability allows for ease in adding extra redundancy, adding extra control effectors, and adding extra control functions.

The computing platform such as the PFCC provides recovery capability, including rapid real-time rollback recovery in a multi-tasking computer environment. The PFCC enables integration of functions, and applications may selectively use the recovery function as required. For example, computing platform 200 shown in FIG. 2 hosts multiple applications 210, 220, 230, 240, and 250. In this example, applications 210 and 220 implement critical functions provided by the digital control system, and the recovery mechanism of the platform provides backup storage of state variable data used by these applications. If a fault is detected during the execution of application 210, recovery of only application 210 can be performed without affecting any of the other applications hosted on the computing platform. The recovery mechanism operation can be verifiable using common built-in-test methods, which can be used to verify operation of the recovery mechanism at any time. The PFCC can also provide monitoring of effector commands and positions.

During operation of control system 100, computing units 112, 114 receive input from sensor sets 150, 152, 154 via data concentrators 156, 158, 160. Each computing unit provides the appropriate data to each computational lane thereof, which operate as separate partitioned processing units. Accordingly, each data set from redundant sensor and command data sets can be simultaneously processed in multiple isolated processing units. The commands signals from each lane of computing units 112, 114 propagate to each of the ACUs 116, 118, 120, and 122. The ACUs transmit the command signals to the smart actuators 124, 126, 128, and 130, which then perform the requested commands as appropriate to control the hydraulic actuators 132, 134, 136, 138, and thereby the control effectors 140-143. During normal operation, the output signals from each processing unit can be monitored internally, or externally by the ACUs, to ensure that each of the computing units 112, 114 are producing results within a predetermined tolerance of the remaining computing units.

Each processing unit of computing units 112, 114 is configured to be capable of rapid recovery from soft faults. To accomplish rapid recovery, each processing unit is configured to retrieve control and logic state variable data from internal memory locations such as a high integrity random access memory. Using the retrieved state variables and appropriate sensor data, each processing unit can fully recover from a soft fault relatively quickly without requiring a data transfusion from another computing unit. The rapid recovery cycle involves halting processor execution, instating state variables from a protected memory area, and starting execution again at an appropriate location in the program execution cycle. Through the use of command blending, equalization, or other techniques, it is not necessary to synchronize with the remaining processing units after initiating the rapid recovery cycle.

Figure 3:
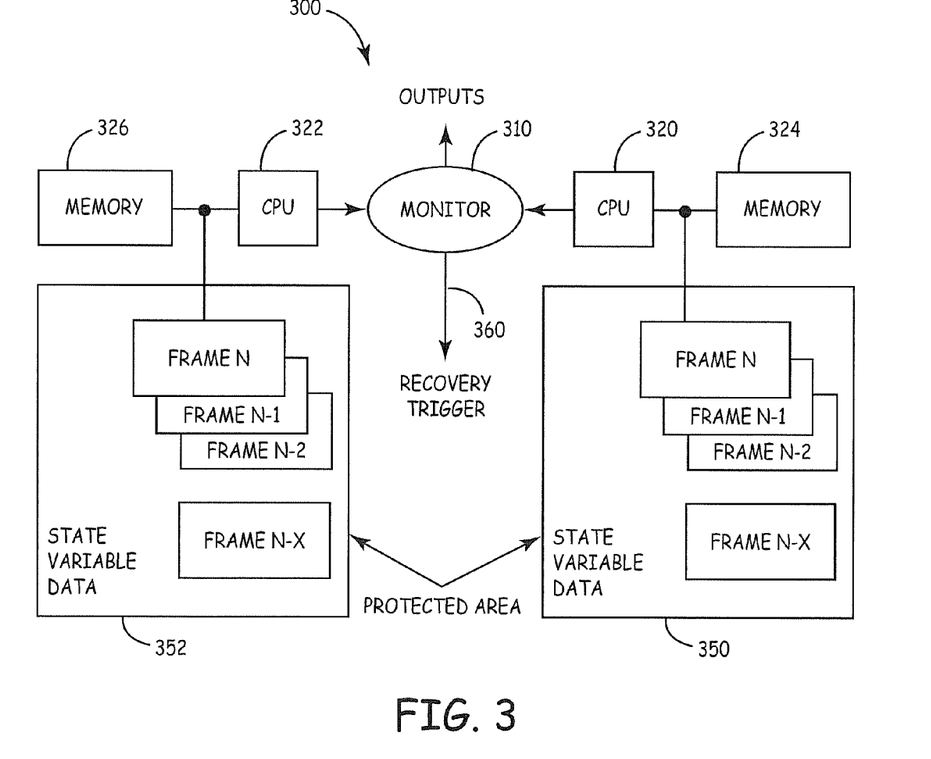
FIG. 3 is a block diagram of a soft fault rapid recovery system that can be used in the digital control system of the invention.

For example, FIG. 3 is a block diagram of a soft fault rapid recovery system 300 that can be used in the digital control system of the invention. The recovery system 300 is implemented internally in each computing platform such as computing units 112 and 114 of control system 100 in FIG. 1. As shown in FIG. 3, a monitor 310 is provided that is in operative communication with a central processing unit (CPU) 320 and a CPU 322. A memory unit 324 operatively communicates with CPU 320, and another memory unit 326 operatively communicates with CPU 322. Protected storage areas can be provided to store state variable data 350, 352. The protected storage areas can include high integrity memory cells such as disclosed in U.S. Pat. No. 6,163,480, which is incorporated herein by reference.

During operation of recovery system 300, state variable data 350, 352 generated by CPU 320 and CPU 322 is stored in memory units 324 and 326, respectively. The state variable data is related to the state the CPU operates under for a given set of inputs and outputs. This data includes states generated by the computing hardware as well as states generated by the application software. The data is stored with respect to a given computing frame N several frames back in time (N-1, N-2, . . . N-X) in the protected storage areas. If the CPU or a memory element is upset to generate a soft fault, such as by interference from EME energy, monitor 310 rapidly detects the soft fault and causes a recovery trigger 360 to initiate. This restores the state variable data saved from one of the previous computing frames and restarts the upset CPU with the most recent good data at the next starting computing frame. The recovery system 300 allows the recovered CPU to start in a time frame near to the time frame of the other CPUs in the system since no reboot of the system is necessary.

A suitable related fault recovery system that can be used in the control system of the present invention is disclosed in copending U.S. patent application Ser. No. 11/058,764 filed on Feb. 16, 2005, which is incorporated herein by reference.

Embodiments of the present invention employ high integrity computer systems utilizing time and space partitioning which allows hosting of multiple pieces of software on a single piece of hardware. Each piece of software is resident in hardware and can perform a multitude of computational functions including but not limited to operating systems, monitoring systems, and application programs.

Embodiments of the present invention can be used in safety critical applications such as a primary flight control application that must robustly execute in real time. Safety critical applications, such as a primary flight control application, must execute in real time to maintain the stability and control of an aircraft in flight and during landing. Typically, real time systems are designed to control physical devices (e.g., valves, servos, motors, heaters) that require timely processing to perform their designated task correctly. As used in this application, real time execution of applications refers to a computer system performing calculations at the current time based on current parameters. In one embodiment, current parameters include current inputs from sensors. A multi-tasking computer system is a computer system adapted to perform multiple tasks, also known as processes, using shared common processing resources. A multi-tasking computer system is adapted to execute two or more software applications simultaneously by scheduling computer processing resources between the two or more software applications. In one embodiment of the present invention, a multi-tasking computer system is adapted to schedule computer processing resources to support execution of at least one application in real time.

Embodiments of the present invention employ high integrity processing systems utilizing space partitioning. Accordingly, when multiple pieces of software are executed by a single hardware platform, it is problematic if the operation of one piece of software contaminates the operation of another piece of software running on the same platform. Thus when the same hardware platform is used to run both safety critical applications and other applications, care must be taken to prevent the contamination of a safety critical application by any other application.

Computer systems implementing time and space partitioning are adept at supporting real time computing recovery capabilities. Time and space partitioning of processor resources guarantees that one application will not corrupt the memory or execution space of any other application run in computational frames before or after it. No application can corrupt the timeline such that the application would overrun its processing time thus starving out the next application running in the next computational frame.

During a rapid recovery cycle, the tolerance used in an ACU to determine if a processing unit is operating properly may be relaxed for that particular processing unit. For example, during normal operation, there may be a predetermined tolerance, within which each of the processing units is expected to operate. If a processing unit produces values that are not within the predetermined tolerance, that processing unit may be determined to be suffering from a soft fault, and a rapid recovery cycle may be initiated. During the rapid recovery cycle, the predetermined tolerance for the affected processing unit may be initially widened and then narrowed over a predetermined time period such that further deviations are acceptable until the processing unit resumes normal operation.

Furthermore, the output of the processing unit may not be included in the derivation of the output from the ACU (e.g., computation of the mid-value) until the output comes within the relaxed tolerance. If the output comes within tolerance (indicating that the computing unit has stabilized) within a predetermined period of time, it may once again be included in the output derivation. Before the predetermined time has expired and the processing unit output has come within tolerance, requests for placing the processing unit into a rapid recovery state may be suspended or "masked" to allow the processing unit to recover. Once the processing unit has stabilized from the recovery cycle, it may be subjected to the previous tolerances. If the output does not come within tolerance within the predetermined time, another request to place the processing unit into a rapid recovery state may be issued.

In general, if the output of a recovered element falls outside of the relaxed tolerance following recovery, that computational element is kept off-line until the system is restarted (i.e., re-powered). Such a failure indicates that the recovery was unsuccessful. While rare, this provides a means for excluding a computational element that does not return to the tolerance within a specified time period. The tolerance used following recovery is tightened over a specific time period until it reaches the original tolerance.

One technique for computing the blended control output involves computing a "mid-value" in which the signals from a processing unit are used to compute a mean and/or median of all of the values produced. This mid-valve is then compared to each signal from each of the processing units in the system. If a discrepancy exists between any particular value produced by any lane and the mean and/or median of all the values (i.e., the mid-values), an error condition is detected and the appropriate processing unit is commanded to initiate a rapid recovery cycle. The discrepancy from the mid-values may be based upon any tolerance value, which can in turn be adjusted based upon desired conditions. The detection of discrepancy from a mean or median value can be processed very rapidly, thus potentially resulting in an identification of an error within one or two computational frames of the value being produced. Accordingly, differences from mid-values may be computed based upon previous mid-values (i.e., values maintained from a previous frame), or can be computed in real time as appropriate.

Alternatively, when one or more of the ACUs 116, 118, 120, 122 sense that one of the computing units 112, 114 are not supplying signals that lie within certain tolerances, the ACUs may transmit a signal to the computing unit in question to request the start of a rapid recovery cycle for a particular processing unit.

The computing units may also be configured to provide equalization, in which the control signal generated by each processing unit are driven toward fine adjustments in the computed mid-value, so that the signals produced by each processing unit result in an equalized control command. Such implementations typically do not require tight synchronization between the various processing units to achieve "equalized" command values because each command signal is driven toward the other signals (i.e., toward a mid-value).

By implementing command blending and equalization, rapid recovery is provided for in a transparent, seamless way. That is, any data errors in any processing unit do not propagate through the system to adversely affect the control function. If one processing unit encounters a soft fault and proceeds to a recovery cycle, the remaining operating processing units are unaffected by the recovery cycle and the operation of the control system as a whole is unaffected. Because the error is very quickly confined, recovery of redundant control commands can be processed very rapidly.

Figure 4:
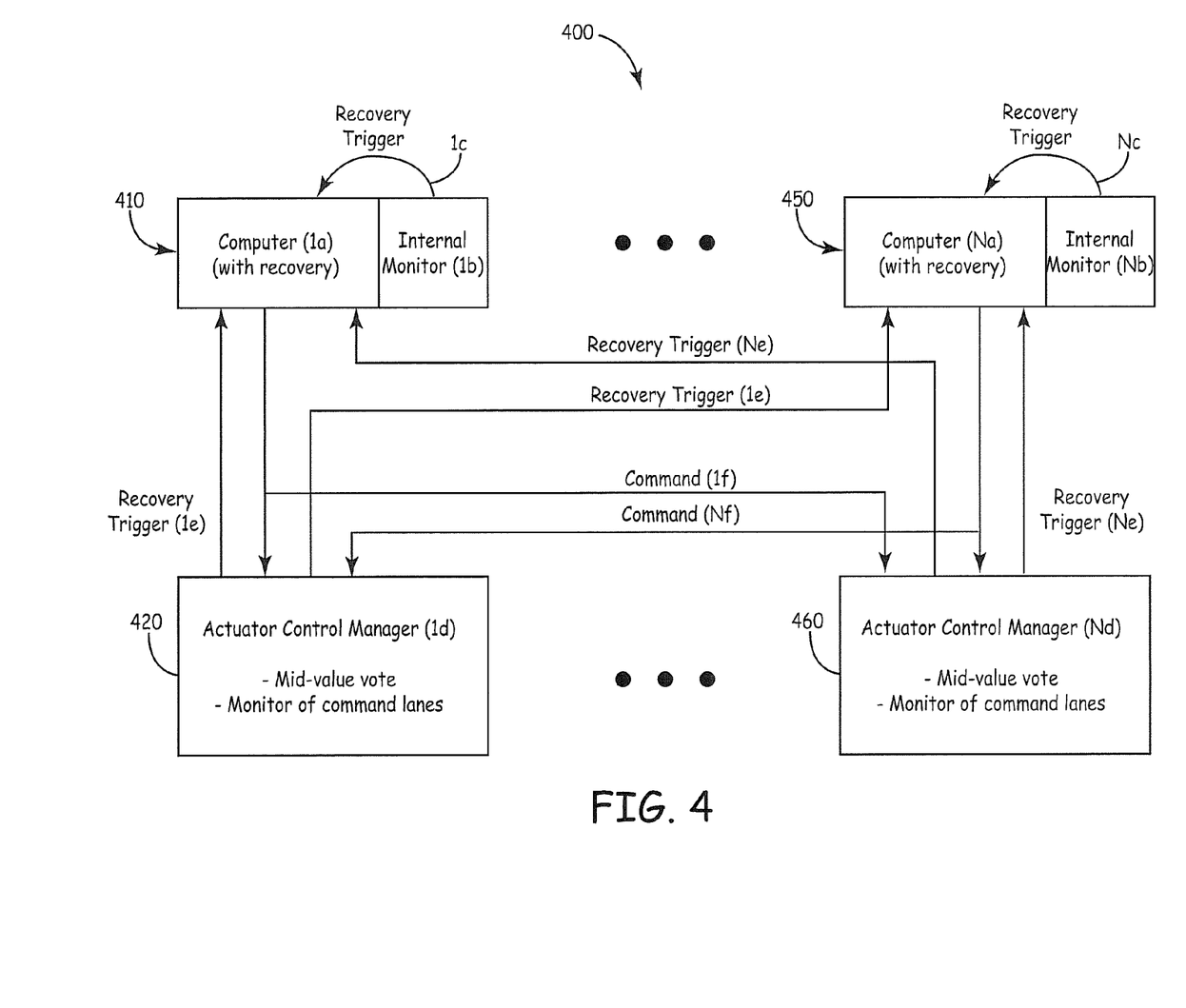
FIG. 4 is a block diagram of a command and recovery management system that can be used in the digital control system of the invention.

FIG. 4 is a block diagram of a command and recovery management system 400 that can be used in the digital control system of the invention. As shown, management system 400 is scalable to any number of redundant computing units with internal monitors that operatively communicate with a respective ACU providing an external monitor for the computing units. This allows for ease in adding extra redundancy to the control system, adding extra control effectors, and adding extra control functions. The management system 400 provides a means for redundancy management that is distributed throughout the system for each redundant component.

As depicted in FIG. 4, a computing unit 410 such as a PFCC includes a processor or computer 1a with recovery available, and an internal monitor 1b that provides a recovery trigger 1c for computer 1a. The computing unit 410 is in operative communication with ACU 420 having an actuator control manager 1d that provides mid-value voting and monitoring of command lanes. An external recovery trigger 1e is provided such that ACU 420 can initiate the recovery of computing unit 410. A redundant computing unit 450 includes a processor or computer (Na) and an internal monitor (Nb) that provides a recovery trigger (Nc) for computer (Na). The computing unit 450 is in operative communication with ACU 460 having an actuator control manager (Nd) that provides mid-value voting and monitoring of command lanes. An external recovery trigger Ne is also provided.

The computing unit 410 is also in operative communication with ACU 460, which provides a redundant external recovery trigger (Ne) to computing unit 410. Likewise, computing unit 450 is in operative communication with ACU 420, which provides a redundant external recovery trigger 1e to computing unit 450. Redundancy is provided by the external recovery triggers since each of the ACUs can initiate computer recovery, because the ACUs calculate a voted value independently.

During operation of management system 400, a command signal if is sent from computer 1a to ACU 420 and ACU 460. If either ACU detects an errant command (for instance an errant command caused by a soft fault), external recovery triggers 1e or (Ne) can be initiated for computer 1a recovery. Likewise, a command signal (Nf) from computer (Na) is sent to ACU 460 and ACU 420, which can initiate external recovery triggers (Ne) and 1e, respectively, for soft fault recovery of computer (Na). The internal monitors 1b and (Nb) can also initiate recovery of computers 1a and (Na) through internal recovery triggers 1c and (Nc), respectively. If an ACU or the internal monitors sense a hard fault (i.e., an unrecoverable fault), then the appropriate computing unit may be shut down or isolated as appropriate.

When the digital control system of the invention is used in the context of aerospace flight control, the control system performs the safety functions necessary for safe flight and landing of aircraft. The control system architecture maintains a pilot connection to control surfaces at all times with no analog backup mode required. The control system architecture also supports multiple recoveries of a flight control computer (FCC) from multiple monitors in real time. This is provided by using multiple redundant actuator command management per axis, and by the FCC supporting multiple redundant external recovery triggers. The FCC and other elements of the control system can execute asynchronously, and the FCC performs equalization on surface positions.

The recovery management of the control system does not compromise aircraft stability, since recovery of each computing lane occurs before an aircraft effect is produced. Even if all computing lanes needed to be recovered, such a recovery would occur before an aircraft effect would be produced. The additional layers of actuator command processing within the control system assures that no aircraft effect is produced during and after recovery. By employing recovery management of redundant elements during/after FCC recovery from soft faults, the actuator command management can use other redundant actuator command values while the FCC is recovering.

In order not to mask hard faults when soft fault recovery is part of a computing environment implementing a flight control function, some form of monitoring for number of recoveries should be provided. Along with keeping track of the number of recoveries, monitoring criteria should, at a minimum, limit the time in which some maximum number of recoveries are allowed for systems that are flight critical, particularly flight control systems. The multiple redundant elements in the control system of the invention provide hard fault management/containment. Using distributed redundancy management ensures that a recurring FCC fault is eventually treated as a hard fault since a hard fault or failure is not inadvertently masked by recovery. For example, a recovery retry counter can be used to ensure that a recurring FCC fault is eventually treated as a hard failure. The FCC will be taken off-line if excessive recovery retries occur in too short of a time.

Determinism of faults is supported by the control system architectural elements. For example, generic faults are confined to the FCC because the other elements in the system are sufficiently analyzable. The recovery mechanism operation is verifiable using common built-in test methods while in service, guaranteeing the recovery mechanism is functional before dispatch. The control system supports graceful as well as rapid recovery of multi-processing computing elements.

The increased reliability of the control system because of rapid recovery increases the mean time between unscheduled removals (MTBUR) for the FCC, moving it toward the mean time between failure (MTBF). Rapid recovery restores correct operation so that no cockpit effect is observed and therefore removal of system hardware due to soft faults will be significantly reduced.

The present invention may be embodied in other specific forms without departing from its essential characteristics. The described embodiments and methods are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A digital control system, comprising:
    an integrated modular computing platform comprising:
        a plurality of computing units comprising:
            a plurality of redundant processing units, each of the processing units configured to generate one or more redundant control commands and execute a plurality of different applications that are time and space partitioned;
            one or more internal monitors for detecting one or more data errors in the control commands and in application state data; and
            one or more recovery triggers for initiating rapid recovery of a processing unit or a specific application if one or more data errors are detected;
        a plurality of actuator control units each in operative communication with the redundant processing units, each of the actuator control units having a pair of redundant computational lanes configured to analyze the control commands and provide feedback to the processing units, the actuator control units configured to initiate a rapid recovery if one or more data errors is detected in one or more of the processing units;
        a plurality of smart actuators each in operative communication with a separate one of the actuator control units, the smart actuators configured to receive an actuator control command from the actuator control units and provide feedback to the actuator control units; and
        a plurality of redundant sensor sets in operative communication with the computing units.

2. The system of claim 1, wherein software applications in the processing units can selectively implement the rapid recovery.

3. The system of claim 1, wherein the processing units provide monitoring of actuator commands and actuator positions.

4. The system of claim 1, wherein the rapid recovery is verifiable using a built-in test during real-time.

5. The system of claim 1, further comprising means for redundancy management distributed throughout the system for each redundant component.

6. The system of claim 1, wherein all system elements can be executed asynchronously.

7. The system of claim 1, wherein the actuator control units are configured to compute a blended command for the control commands, and initiate a rapid recovery in one or more of the processing units if the difference between a control command generated by a processing unit and the blended command exceeds a threshold value.

8. The system of claim 1, wherein each actuator control unit independently monitors each processing unit command.

9. The system of claim 1, further comprising a plurality of actuator devices, each of the actuator devices in operative communication with a separate one of the smart actuators.

10. The system of claim 9, wherein the actuator devices are each operatively connected to one or more control effectors.

11. The system of claim 1, wherein the internal monitors are configured to detect one or more soft faults in the processing units.

12. The system of claim 11, further comprising a soft fault recovery system in the computing units, the soft fault recovery system configured to duplicate state variable data stored in one or more memory devices in the computing units.

13. The system of claim 12, wherein the soft fault recovery system is configured to restore the duplicate state variable data when a soft fault is detected so that one or more processing units can resume processing using the duplicate state variable data.

14. The system of claim 1, wherein management of system redundancy occurs before, during, and after recovery.

15. The system of claim 1, wherein the processing units provide a real-time multi-tasking computing environment.

16. A recoverable digital flight control system, comprising:
    an integrated modular computing platform comprising:
        a first primary flight control computer having a pair of redundant computational lanes configured to generate one or more redundant flight control commands, the first primary flight control computer comprising:
            a plurality of processing units, each of the processing units configured to execute a plurality of different applications that are time and space partitioned one or more internal monitors for detecting one or more data errors in the flight control commands and in application state data; and one or more recovery triggers for initiating rapid recovery if one or more data errors are detected;

a second primary flight control computer configured for redundant processing with respect to the first primary flight control computer and having a pair of redundant computational lanes configured to generate one or more redundant flight control commands, the second primary flight control computer comprising:

a plurality of processing units, each of the processing units configured to execute a plurality of different applications that are time and space partitioned;

one or more internal monitors for detecting one or more data errors in the flight control commands and in application state data; and one or more recovery triggers for initiating rapid recovery if one or more data errors are detected;

a plurality of actuator control units each in operative communication with the primary flight control computers, each of the actuator control units having a pair of redundant computational lanes configured to analyze the flight control commands and provide feedback to each of the computational lanes of the primary flight control computers;

a plurality of dual channel smart actuators each in operative communication with a separate one of the actuator control units, the smart actuators configured to receive an actuator control command from the actuator control units and provide feedback to the actuator control units; and a plurality of redundant flight sensors in operative communication with the primary flight control computers.

17. The system of claim 16, wherein the smart actuators are in operative communication with a plurality of flight control surfaces.

18. The system of claim 16, wherein fault events and recoveries are transparent to aircraft function, and recovery management of the system does not compromise aircraft stability.

19. The system of claim 16, wherein any recurring fault is treated as a hard failure.

20. The system of claim 16, wherein generic faults in the primary flight control computers are confined due to other system elements being sufficiently analyzable.

* * * * *